(12) United States Patent
Morioka et al.

(10) Patent No.: US 9,036,535 B2
(45) Date of Patent: May 19, 2015

(54) MOBILE COMMUNICATION METHOD, RADIO BASE STATION, AND RELAY NODE TO AVOID INTERFERENCE IN A RANDOM ACCESS PROCEDURE

(75) Inventors: Yasufumi Morioka, Tokyo (JP); Hideaki Takahashi, Tokyo (JP); Yukihiko Okumura, Tokyo (JP); Mikio Iwamura, Tokyo (JP); Akira Yamada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 241 days.

(21) Appl. No.: 13/808,269

(22) PCT Filed: Jul. 7, 2011

(86) PCT No.: PCT/JP2011/065614
§ 371 (c)(1),
(2), (4) Date: Mar. 14, 2013

(87) PCT Pub. No.: WO2012/005336
PCT Pub. Date: Jan. 12, 2012

(65) Prior Publication Data
US 2013/0170428 A1 Jul. 4, 2013

(30) Foreign Application Priority Data
Jul. 8, 2010 (JP) ................................ P2010-155939

(51) Int. Cl.
*H04W 74/08* (2009.01)
*H04B 7/155* (2006.01)
(Continued)

(52) U.S. Cl.
CPC ........... *H04W 74/0833* (2013.01); *H04B 7/155* (2013.01); *H04W 74/002* (2013.01); *H04W 84/047* (2013.01); *H04W 88/08* (2013.01)

(58) Field of Classification Search
CPC .......... H04W 4/00; H04W 8/00; H04W 8/02; H04W 36/00; H04W 36/0005; H04W 72/00; H04W 72/04; H04W 4/06; H04W 4/08; H04W 84/047; H04W 88/08; H04B 7/155
USPC .............. 370/310, 310.2, 313, 315, 331, 328, 370/329, 338, 351
See application file for complete search history.

(56) References Cited

U.S. PATENT DOCUMENTS

| 8,401,031 | B2* | 3/2013 | Park et al. | 370/431 |
| 8,483,146 | B2* | 7/2013 | Chun et al. | 370/329 |
| 8,665,857 | B2* | 3/2014 | Meylan | 370/349 |

FOREIGN PATENT DOCUMENTS

EP 2362708 A1 8/2011

OTHER PUBLICATIONS

International Search Report issued in PCT/JP2011/065614 mailed Oct. 11, 2011 (8 pages).
(Continued)

*Primary Examiner* — Anh Ngoc Nguyen
(74) *Attorney, Agent, or Firm* — Osha Liang LLP

(57) ABSTRACT

A mobile communication method according to the present invention includes a step of transmitting, by a radio base station DeNB, "RA Response" to a mobile station UE within a "RA Response window" for the mobile station UE when "RA Preamble" is received from the mobile station UE, a step of transmitting, by a relay node RN, a signal to the mobile station UE in a subframe other than an MBSFN subframe, and a step of transmitting, by the radio base station DeNB, "RA Response" to the relay node RN in an MBSFN subframe of a "RA Response window" for the relay node RN when "RA Preamble" is received from the relay node RN.

8 Claims, 11 Drawing Sheets

(51) Int. Cl.
*H04W 74/00* (2009.01)
*H04W 84/04* (2009.01)
*H04W 88/08* (2009.01)

(56) References Cited

OTHER PUBLICATIONS

Written Opinion issued in PCT/JP2011/065614 mailed Oct. 11, 2011 (7 pages).
ETRI; "Consideration on MAC procedures for Un interface"; 3GPP TSG RAN WG2 #68, R2-096497; Jeju, Korea; Nov. 9-13, 2009 (4 pages).
Texas Instruments; "On the design of relay node for LTE-advanced"; 3GPP TSG RAN WG1 #55bis, R1-090290; Ljubljana, Slovenia; Jan. 12-16, 2009 (10 pages).
Qualcomm Incorporated; "Use of RACH for transition from Uu to Un operation on DeNB-RN link"; 3GPP TSG RAN WG2 #69bis, R2-102401; Beijing, China; Apr. 12-16, 2010 (3 pages).
3GPP TS 36.331 V9.3.0; "3rd Generation Partnership Project; Technical Specification Group Radio Access Network; Evolved Universal Terrestrial Radio Access (E-UTRA); Radio Resource Control (RRC); Protocol specification (Release 9)"; Jun. 2010; pp. 149-150 (3 pages).
3GPP TS 36.300 V9.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)"; Jun. 2010 (170 pages).
Extended European Search Report dated Nov. 25, 2014 in corresponding European Application No. 11803670.6 (9 pages).

* cited by examiner

FIG. 4

RACH-ConfigCommon information element

```
-- ASN1START

RACH-ConfigCommon ::=          SEQUENCE {
    ra-SupervisionInfo         SEQUENCE {
        preambleTransMax       ENUMERATED {
                               n3, n4, n5, n6, n7, n8, n10, n20,
                               n50,
                               n100, n200},
    ra-ResponseWindowSize      ENUMERATED {
                               sf2, sf3, sf4, sf5, sf6, sf7,
                               sf8, sf10},
    ra-ResponseWindowSizeRA    ENUMERATED {
                               sf2, sf3, sf4, sf5, sf6, sf7,
                               sf8, sf10,sf20,sf30,sf40},
    mac-ContentionResolutionTimer  ENUMERATED {
                               sf8, sf16, sf24, sf32, sf40, sf48,
                               sf56, sf64}
},
```

MOBILE COMMUNICATION METHOD, RADIO BASE STATION, AND RELAY NODE TO AVOID INTERFERENCE IN A RANDOM ACCESS PROCEDURE

TECHNICAL FIELD

The present invention relates to a mobile communication method, a radio base station, and a relay node.

BACKGROUND ART

FIG. 14 illustrates a "contention based Random Access procedure" defined by 3GPP.

Specifically, as illustrated in FIG. 14, in step 1, a mobile station UE transmits "Random Access (RA) Preamble" to a radio base station eNB, and in step 2, the radio base station eNB transmits "Random Access (RA) Response" to the mobile station UE.

In step 3, the mobile station UE transmits "Schedule Transmission" to the radio base station eNB, and in step S4, the radio base station eNB transmits "Contention Resolution" to the mobile station UE.

CITATION LIST

Non Patent Literature

[NPL 1] 3GPP TS36.300 10.1.5.1

In an LTE (Long Term Evolution)-Advanced scheme, a mobile station UE is configured to be able to connect to a radio base station DeNB through a relay node RN.

Similarly to the mobile station UE, the relay node RN is also configured to be able to perform the RA procedure between the radio base station DeNB and the relay node RN.

Furthermore, when the relay node RN operates as a "Half Duplex inband relay", the relay node RN is configured to transmit a signal to the mobile station UE in subframes other than MBSFN (MBMS Single Frequency Network) subframes, and is configured not to transmit a signal to the mobile station UE in the MBSFN subframes, as illustrated in FIG. 15(a) and FIG. 15(b).

Accordingly, in the RA procedure, it is necessary for the radio base station DeNB to transmit "RA Response" to the relay node RN in the MBSFN subframes in order to avoid interference.

Furthermore, in the RA procedure, when "RA Preamble" is received, it is necessary for the radio base station DeNB to transmit the "RA Response" within a "RA Response window".

Accordingly, in the RA procedure, as illustrated in FIG. 15(a), when the "RA Preamble" is received from the relay node RN, it is necessary for the radio base station DeNB to transmit the "RA Response" to the relay node RN in the MBSFN subframes (for example, subframes #3/#6/#7/#8/#1) within the "RA Response window".

The RA procedure, as illustrated in FIG. 15(b), however, has a problem that when the MBSFN subframes are not included in the "RA Response window", it is not possible for the radio base station DeNB to transmit the "RA Response".

SUMMARY OF THE INVENTION

Therefore, the present invention has been achieved in view of the above-mentioned problems, and an object thereof is to provide a mobile communication method, a radio base station, and a relay node, with which it is possible to avoid interference in an RA procedure between the radio base station and the relay node.

A first characteristic of the present invention is summarized in that a mobile communication method includes: a step of transmitting, by a radio base station, broadcast information including a returnable period of a random access response for a mobile station and a returnable period of a random access response for a relay node; a step of transmitting, by the radio base station, a random access response to the mobile station within the returnable period of the random access response for the mobile station when a random access preamble is received from the mobile station; a step of transmitting, by a relay node, a signal to the mobile station in a subframe other than an MBSFN subframe; and a step of transmitting, by the radio base station, a random access response to the relay node in the MBSFN subframe of the returnable period of the random access response for the relay node when a random access preamble is received from the relay node.

A second characteristic of the present invention is summarized in that a mobile communication method includes: a step of transmitting, by a relay node, a signal to a mobile station in a subframe other than an MBSFN subframe; a step of setting, by a radio base station, the MBSFN subframe to be included in a returnable period of a random access response; and a step of transmitting, by the radio base station, a random access response to the relay node in an MBSFN subframe of the returnable period of the random access response when a random access preamble is received from the relay node.

A third characteristic of the present invention is summarized in that a mobile communication method includes: a step of transmitting, by a relay node, a signal to a mobile station in a subframe other than an MBSFN subframe; a step of releasing, by the relay node, setting of the MBSFN subframe while stopping transmitting a signal to the mobile station when a random access procedure is started; and a step of transmitting, by the radio base station, a random access response to the relay node within a returnable period of a random access response when a random access preamble is received from the relay node.

A fourth characteristic of the present invention is summarized in that a radio base station includes: a broadcast information transmission unit configured to transmit broadcast information including a returnable period of a random access response for a mobile station and a returnable period of a random access response for a relay node; and a random access procedure execution unit configured to transmit a random access response to the mobile station within the returnable period of the random access response for the mobile station when a random access preamble is received from the mobile station, and to transmit a random access response to the relay node in an MBSFN subframe of the returnable period of the random access response for the relay node when a random access preamble is received from the relay node, wherein in the MBSFN subframe, transmission of a signal addressed to the mobile station is not performed by the relay node.

A fifth characteristic of the present invention is summarized in that a radio base station includes: a setting unit configured to set an MBSFN subframe to be included in a returnable period of a random access response; and a random access procedure execution unit configured to transmit a random access response to a relay node in the MBSFN subframe of a returnable period of a random access response for the relay node when a random access preamble is received from the relay node, wherein in the MBSFN subframe, transmission of a signal addressed to the mobile station is not performed by the relay node.

A sixth characteristic of the present invention is summarized in that a relay node includes: a transmission unit configured to transmit a signal to a mobile station in a subframe other than an MBSFN subframe, wherein when a random access procedure is started, the transmission unit is configured to release setting of the MBSFN subframe and to stop transmitting a signal to the mobile station.

As described above, according to the present invention, it is possible to provide a mobile communication method, a radio base station, and a relay node, by which it is possible to avoid interference in an RA procedure between the radio base station and the relay node.

BRIEF DESCRIPTION OF DRAWINGS

FIG. 4 is a diagram illustrating an example of a format of an information element "RACH-ConfigCommon" of SIB2 transmitted by the radio base station according to the first embodiment of the present invention.

DESCRIPTION OF EMBODIMENTS (Mobile Communication System According to First Embodiment of the Present Invention)

A mobile communication system according to a first embodiment of the present invention is described with reference to FIG. 1 through FIG. 7.

Figure 1:
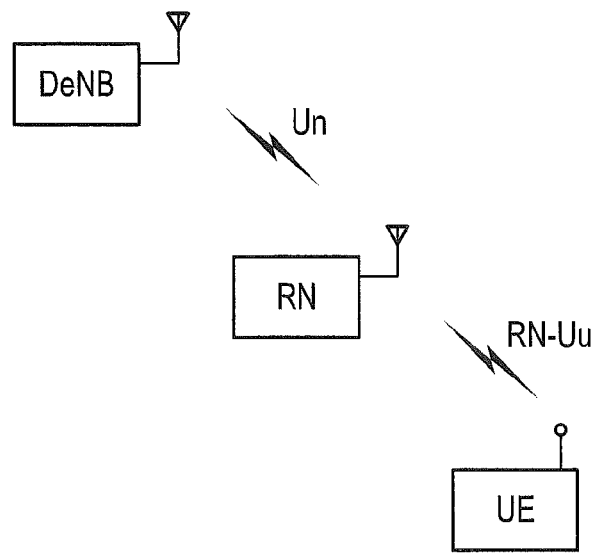
FIG. 1 is a diagram illustrating the entire configuration of a mobile communication system according to a first embodiment of the present invention.

As illustrated in FIG. 1, the mobile communication system according to the present embodiment is an LTE-Advanced mobile communication system, and includes a radio base station DeNB and a relay node RN.

Furthermore, the radio base station DeNB and the relay node RN are connected to each other through a Un interface, and the relay node RN and a mobile station UE are connected to each other through an RN-Uu interface.

Figure 2:
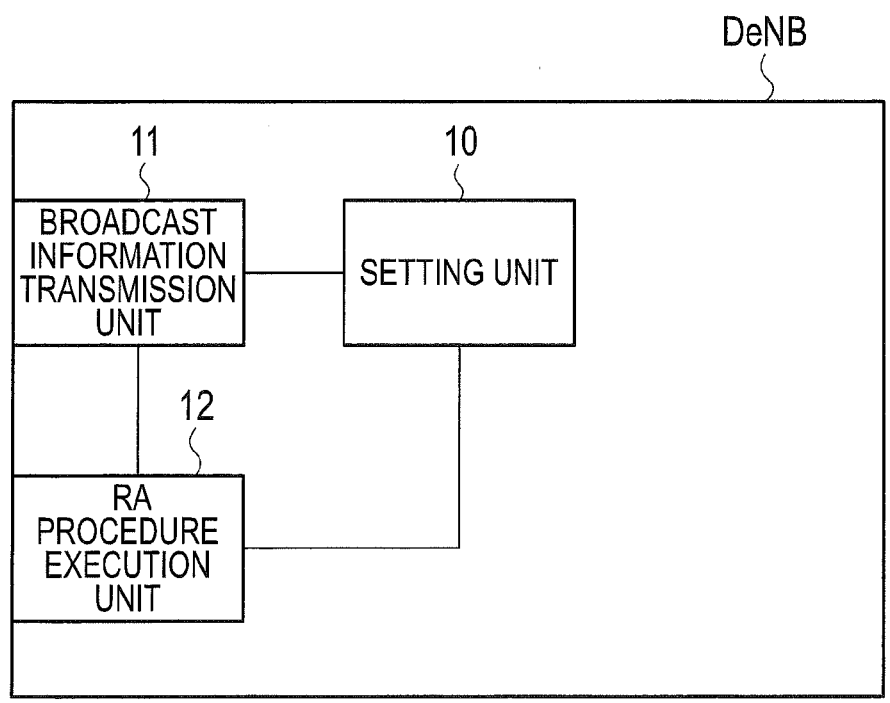
FIG. 2 is a functional block diagram of a radio base station according to the first embodiment of the present invention.

As illustrated in FIG. 2, the radio base station DeNB includes a setting unit 10, a broadcast information transmission unit 11, and a RA procedure execution unit 12.

The setting unit 10 is configured to set a "RA Response window" for the mobile station UE and a "RA Response window" for the relay node RN.

Figure 3:
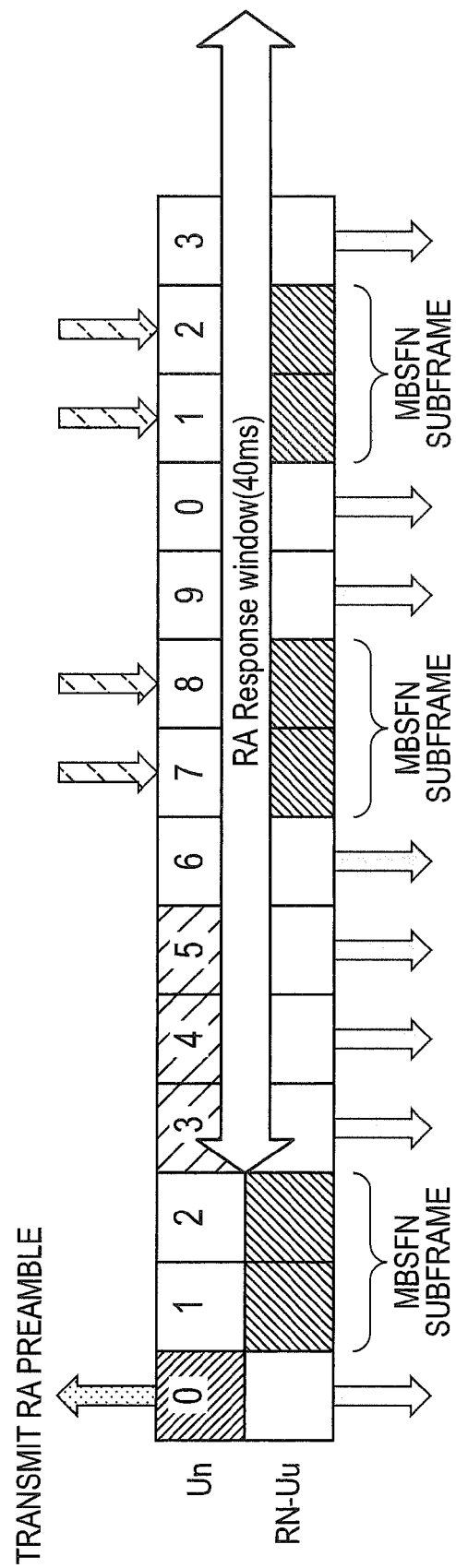
FIG. 3 is a diagram for explaining an example of a "RA Response window" determined by the radio base station according to the first embodiment of the present invention.

As illustrated in FIG. 3, the setting unit 10 may be configured to render equal the "RA Response window" for the relay node RN, to a repetition period (for example, 40 subframes, that is, 40 ms) of an MBSFN subframe.

Furthermore, the setting unit 10 is configured to set the MBSFN subframe in the relay node RN.

The broadcast information transmission unit 11 is configured to transmit MIB (Master Information Block) or SIB (System Information Block) to a cell subordinate to the radio base station DeNB as broadcast information.

Furthermore, the broadcast information transmission unit 11 is configured to transmit SIB including the "RA Response window" for the mobile station UE and the "RA Response window" for the relay node RN.

For example, as illustrated in FIG. 4, the broadcast information transmission unit 11 is configured to set the "RA Response window" for the mobile station UE in an information element "ra-ResponseWindowSize" of an information element "RACH-ConfigCommon" in the SIB, and to set the "RA Response window" for the relay node RN in an information element "ra-ResponseWindowSizeRN" of the information element "RACH-ConfigCommon" in the SIB.

The RA procedure execution unit 12 is configured to perform a RA procedure between the mobile station UE and the relay node RN.

Furthermore, when "RA Preamble" is received from the mobile station UE, the RA procedure execution unit 12 is configured to transmit "RA Response" to the mobile station UE within the "RA Response window" for the mobile station UE.

Furthermore, when "RA Preamble" is received from the relay node RN, the RA procedure execution unit 12 is configured to transmit "RA Response" to the relay node RN in an MBSFN subframe of the "RA Response window" for the relay node RN.

Figure 5:
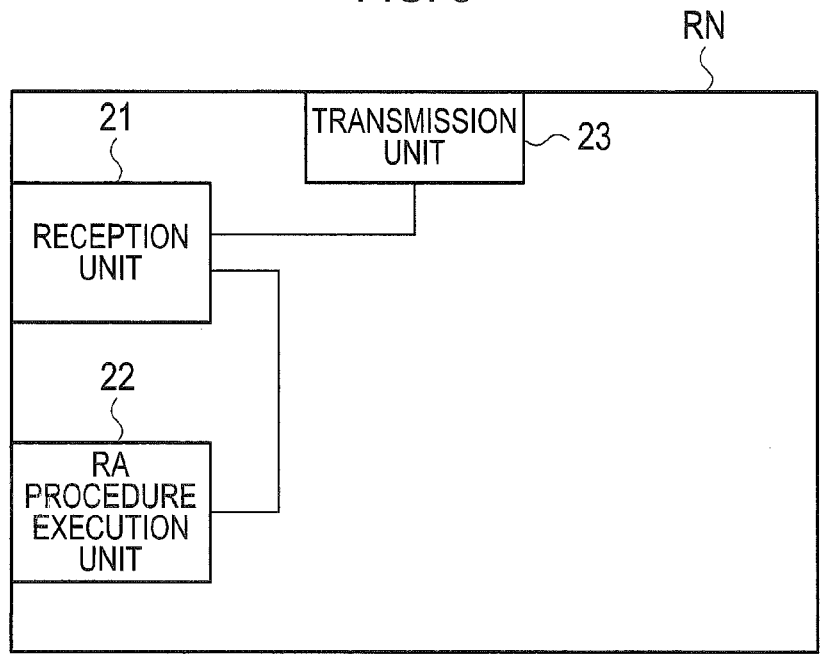
FIG. 5 is a functional block diagram of a relay node according to the first embodiment of the present invention.

As illustrated in FIG. 5, the relay node RN includes a reception unit 21, a RA procedure execution unit 22, and a transmission unit 23.

The reception unit 21 is configured to receive broadcast information, a control signal, or a data signal transmitted by the radio base station DeNB.

The RA procedure execution unit 22 is configured to perform a RA procedure between the radio base station DeNB and the relay node RN.

Furthermore, the RA procedure execution unit 22 is configured to wait for the "RA Response" from the radio base station DeNB within the "RA Response window" for the relay node RN.

The transmission unit 23 is configured to transmit a signal to the mobile station UE. Specifically, the transmission unit 23 is configured to transmit a signal to the mobile station UE in a subframe other than an MBSFN subframe.

Furthermore, the MBSFN subframe is configured to be set based on the control signal transmitted by the radio base station DeNB.

Figure 6:
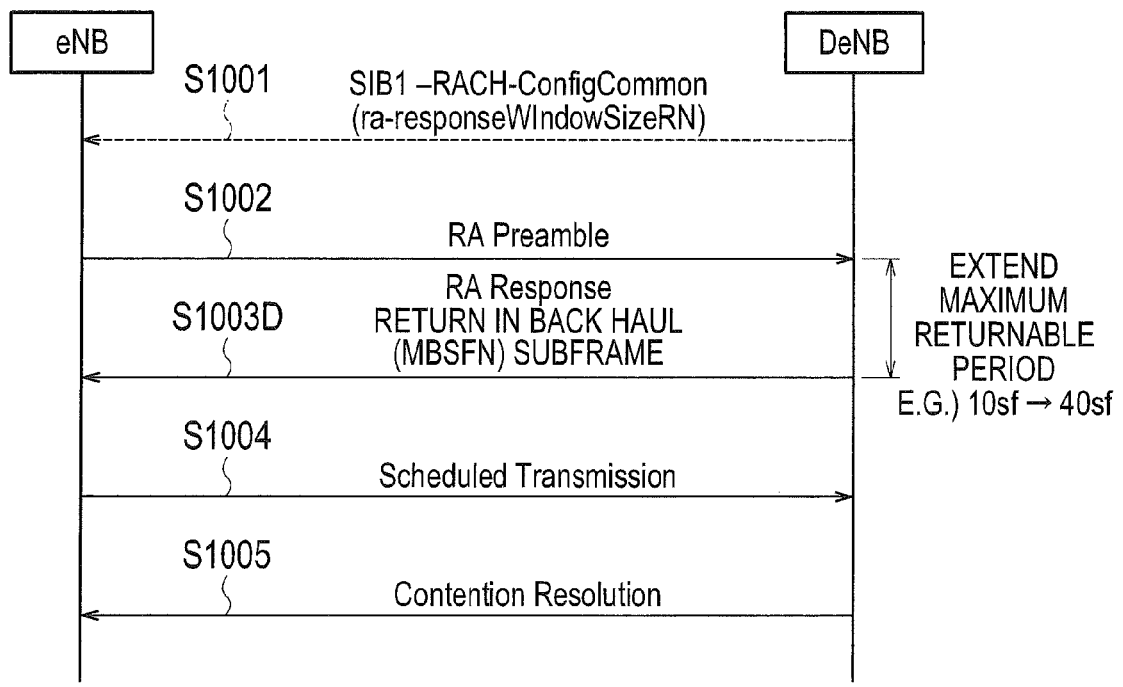
FIG. 6 is a sequence diagram showing an operation of the mobile communication system according to the first embodiment of the present invention.
Figure 7:
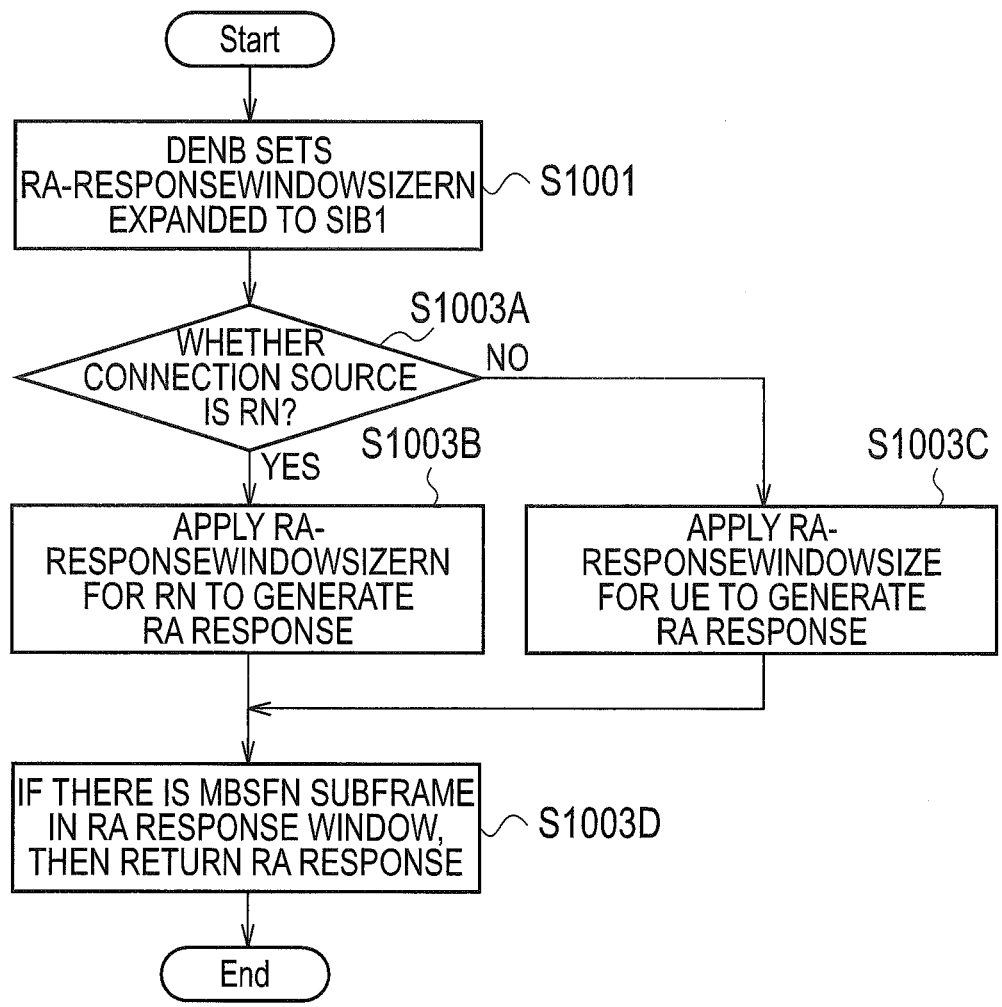
FIG. 7 is a flowchart showing an operation of the mobile communication system according to the first embodiment of the present invention.

Hereinafter, with reference to FIG. 6 and FIG. 7, the operation of the mobile communication system according to the present embodiment will be described.

Furthermore, it is assumed that when the relay node RN operates as a "Half Duplex inband relay", the relay node RN transmits a signal to the mobile station UE in subframes other than MBSFN subframes, and does not transmit a signal to the mobile station UE in the MBSFN subframes.

In step S1001, the radio base station DeNB transmits SIB1 in which the "RA Response window" for the mobile station UE has been set in the information element "ra-ResponseWindowSize" of the information element "RACH-Config-Common", and the "RA Response window" for the relay node RN has been set in the information element "ra-ResponseWindowSizeRN" of the information element "RACH-ConfigCommon".

In step S1002, the relay node RN generates "RA Preamble" on the basis of RACH_ROOT_SEQUENCE included in SIB, and transmits the "RA Preamble" to the radio base station DeNB.

In step S1003A, the radio base station DeNB determines whether a transmission source of the received "RA Preamble" is the mobile station UE or the relay node RN.

When it is determined that the transmission source of the received "RA Preamble" is the relay node RN, the radio base station DeNB applies the "RA Response window" for the relay node RN in step S1003B.

Meanwhile, when it is determined that the transmission source of the received "RA Preamble" is the mobile station UE, the radio base station DeNB applies the "RA Response window" for the mobile station UE in step S1003C.

In step S1003D, the radio base station DeNB transmits "RA Response" to the relay node RN in an MBSFN subframe of the "RA Response window" for the relay node RN.

Alternatively, in the step S1003D, the radio base station DeNB transmits the "RA Response" to the mobile station UE in a normal subframe of the "RA Response window" for the mobile station UE.

In step S1004, the relay node RN transmits "Schedule Transmission" to a radio base station eNB, and in step S1005, the radio base station eNB transmits "Contention Resolution" to the relay node RN.

In accordance with the mobile communication system according to the present embodiment, the "RA Response window" for the relay node RN and the "RA Response window" for the mobile station UE are separately defined and the "RA Response window" for the relay node RN is allowed to be longer than the "RA Response window" for the mobile station UE, so that it is possible for the radio base station DeNB to improve the probability of transmission of the "RA Response" in the MBSFN subframe in the RA procedure.

(Mobile Communication System According to Second Embodiment of the Present Invention)

Figure 9:
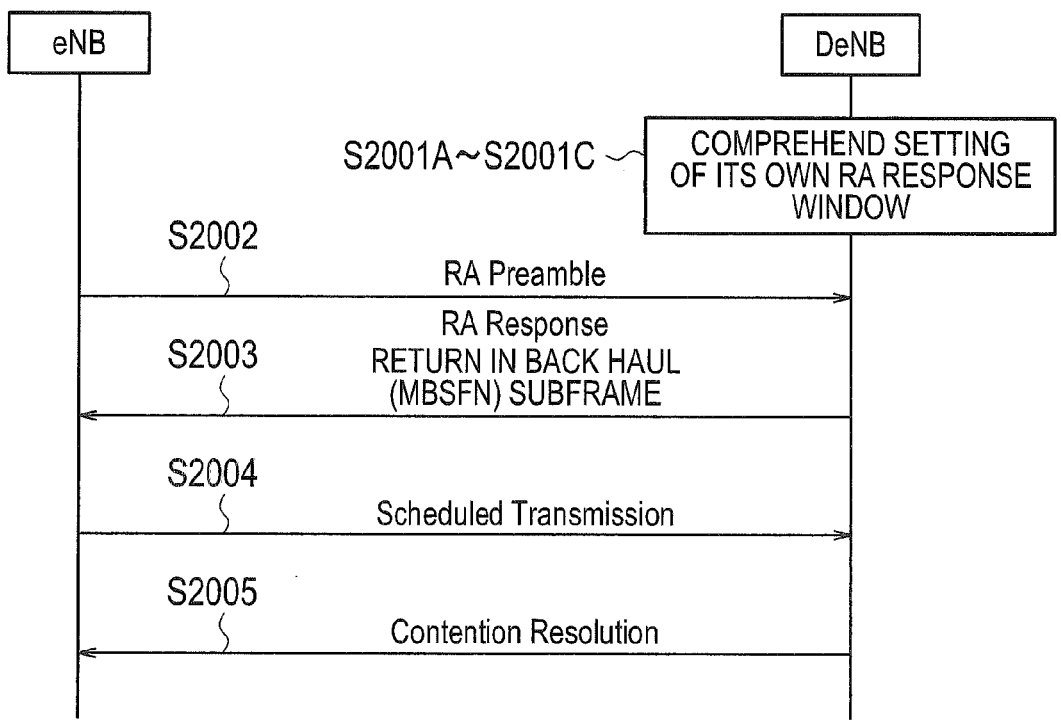
FIG. 9 is a sequence diagram showing an operation of a mobile communication system according to the second embodiment of the present invention.
Figure 10:
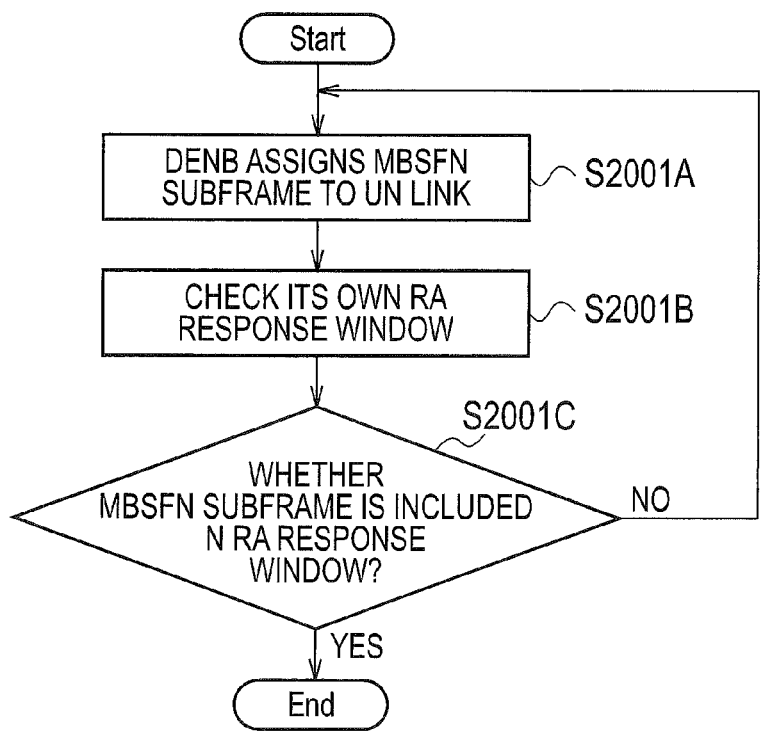
FIG. 10 is a flowchart showing an operation of the mobile communication system according to the second embodiment of the present invention.

A mobile communication system according to a second embodiment of the present invention is described with reference to FIG. 8 through FIG. 10. Hereinafter, the mobile communication system according to the present embodiment will be described while focusing on the difference from the above-mentioned mobile communication system according to the first embodiment.

Figure 8:
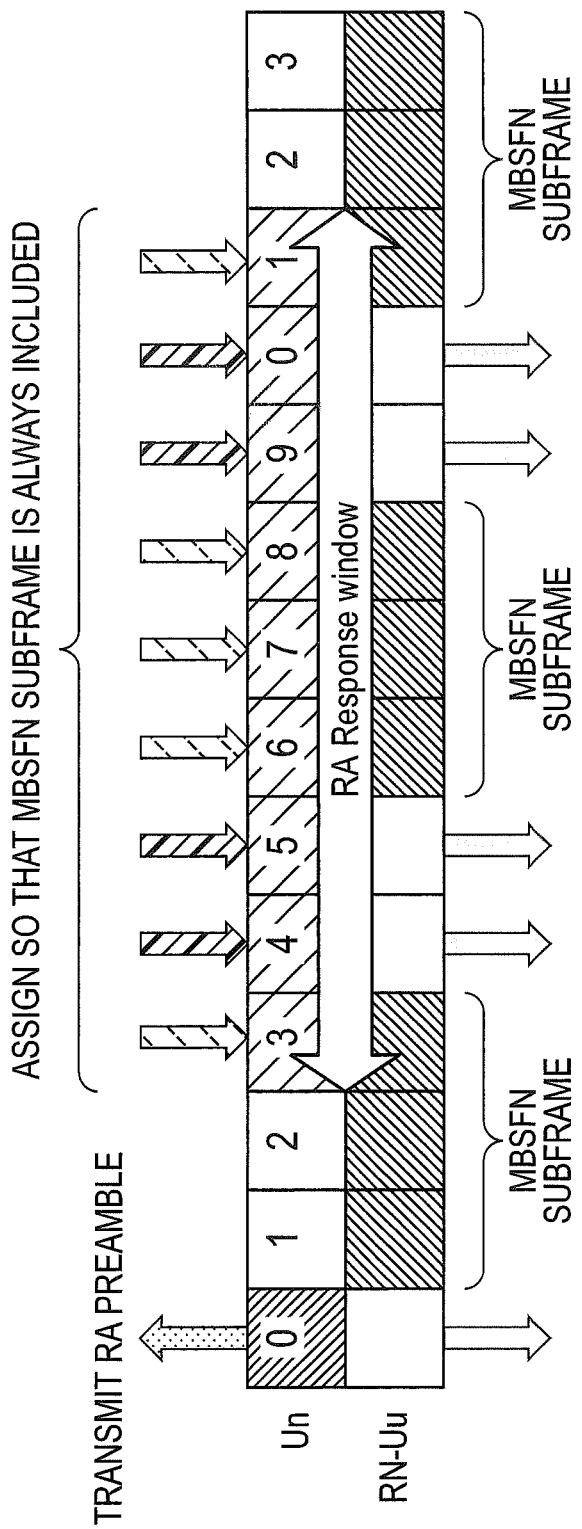
FIG. 8 is a diagram for explaining an example of a "RA Response window" determined by a radio base station according to a second embodiment of the present invention.

The setting unit 10 of the radio base station DeNB is configured to set MBSFN subframes of each relay node RN to be included in the "RA Response window" as illustrated in FIG. 8.

Hereinafter, with reference to FIG. 9 and FIG. 10, the operation of the mobile communication system according to the present embodiment will be described.

Furthermore, it is assumed that when the relay node RN operates as a "Half Duplex inband relay", the relay node RN transmits a signal to the mobile station UE in subframes other than MBSFN subframes, and does not transmit a signal to the mobile station UE in the MBSFN subframes.

In steps S2001A to S2001C, the radio base station DeNB sets the MBSFN subframes of the relay node RN to be included in the "RA Response window" broadcasted through the SIB1.

In step S2002, a relay node RN in an RRC_Connected state in a cell subordinate to the radio base station DeNB transmits "RA Preamble" to the radio base station DeNB.

In step S2003, the radio base station DeNB transmits "RA Response" to the relay node RN in the MBSFN subframes of the above-mentioned "RA Response window".

In step S2004, the relay node RN transmits "Schedule Transmission" to the radio base station eNB, and in step S2005, the radio base station eNB transmits "Contention Resolution" to the relay node RN.

In accordance with the mobile communication system according to the present embodiment, the MBSFN subframes of each relay node RN are included in the "RA Response window", so that it is possible for the radio base station DeNB to transmit the "RA Response" in the MBSFN subframes in the RA procedure.

(Mobile Communication System According to Third Embodiment of the Present Invention)

Figure 12:
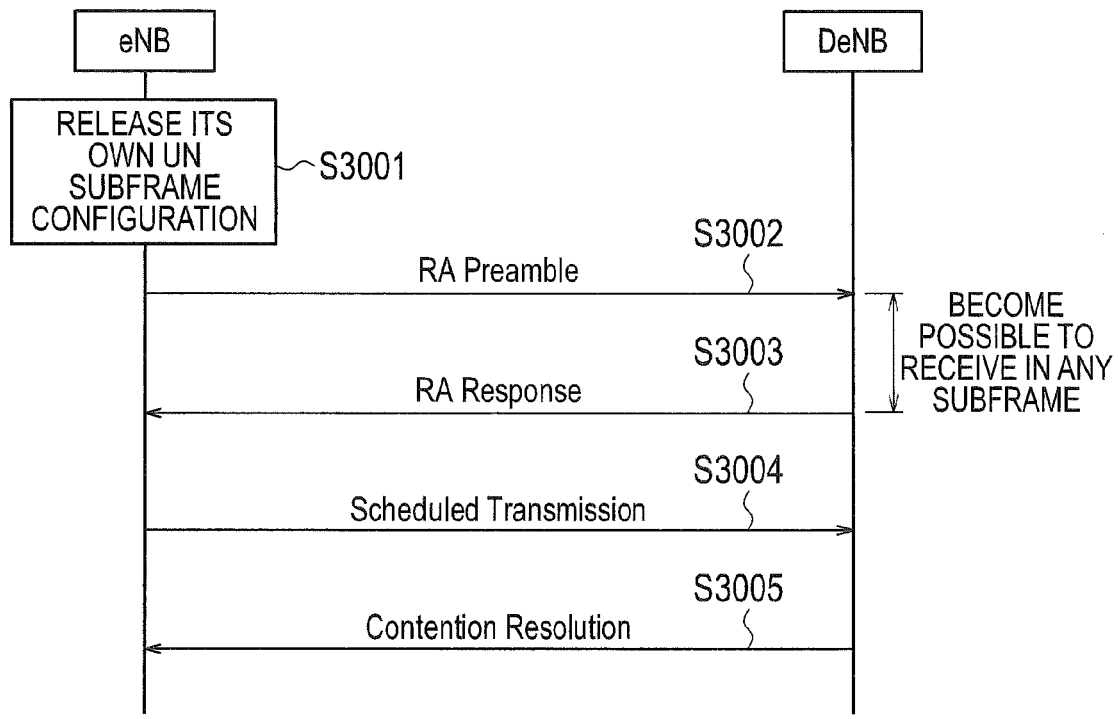
FIG. 12 is a sequence diagram showing an operation of a mobile communication system according to the third embodiment of the present invention.
Figure 13:
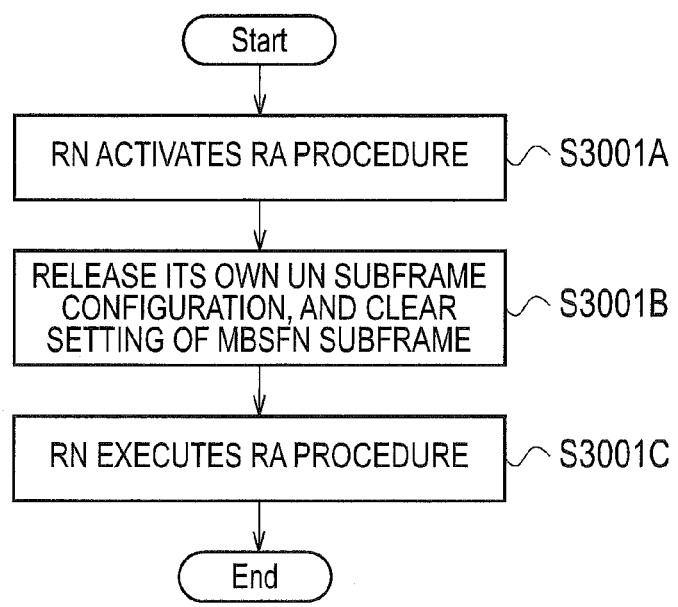
FIG. 13 is a flowchart showing an operation of the mobile communication system according to the third embodiment of the present invention.
Figure 14:
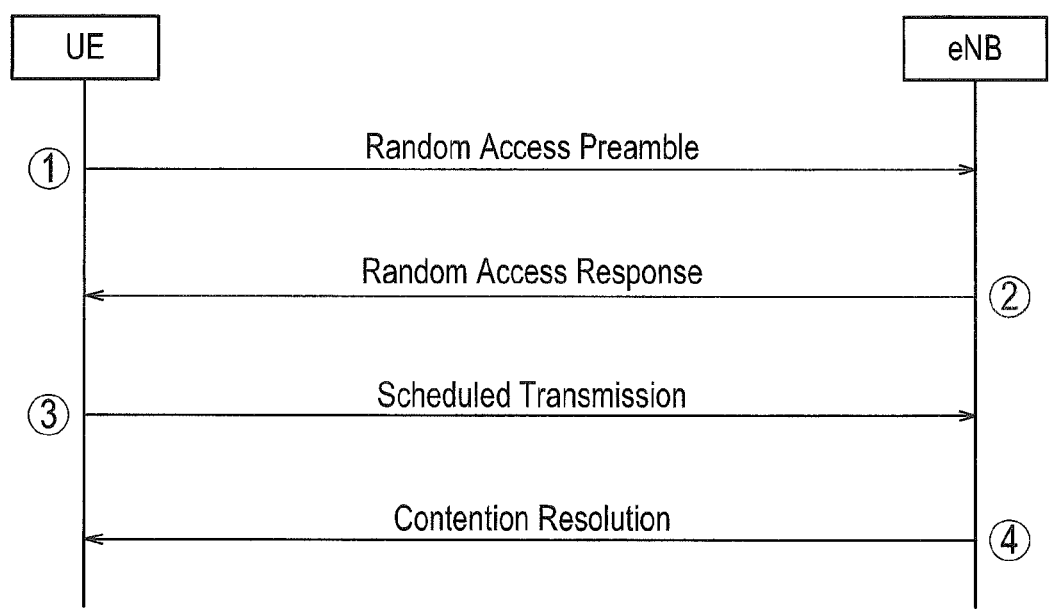
FIG. 14 is a diagram for explaining a problem of a conventional mobile communication system.
Figure 15:
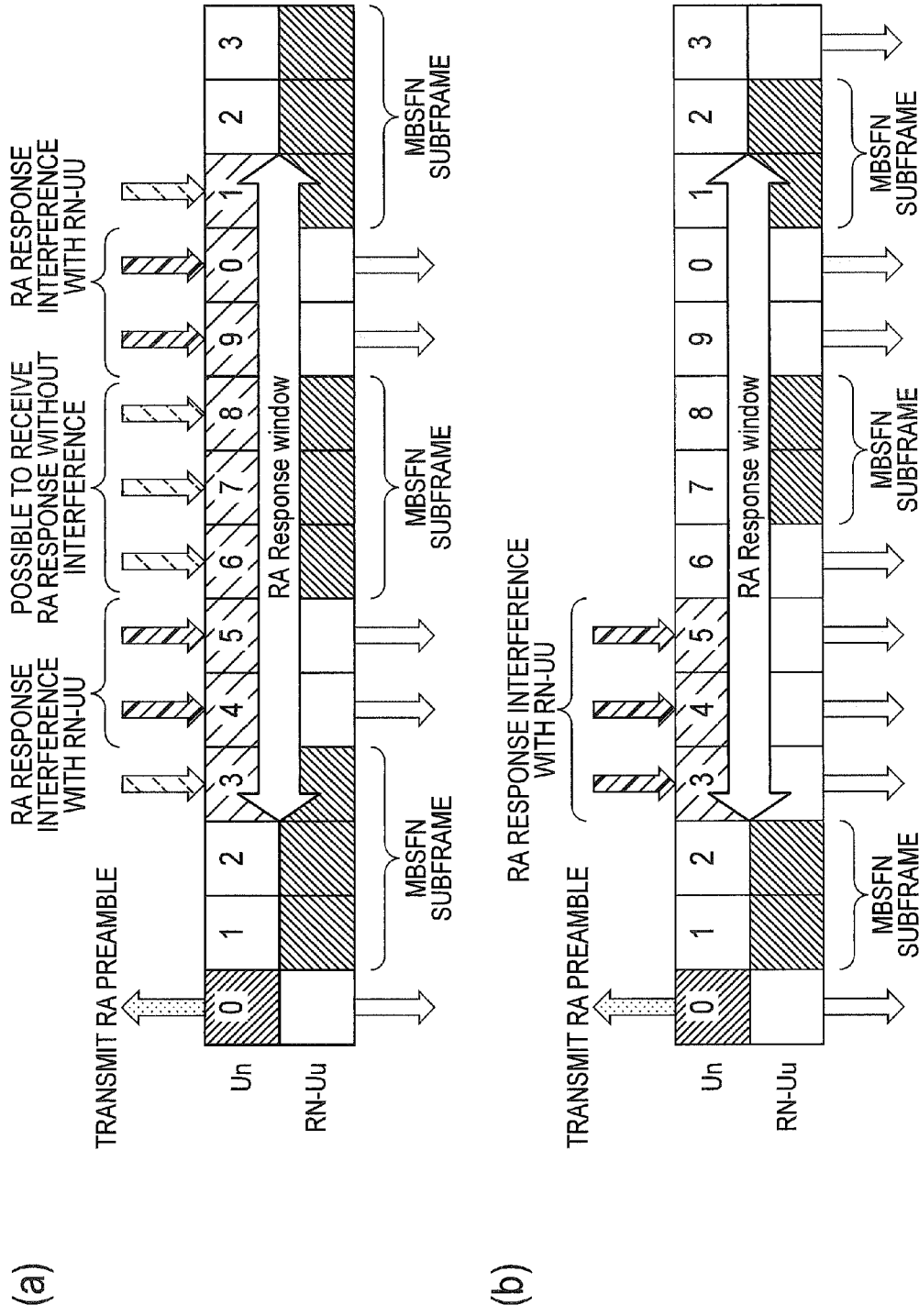
FIGS. 15(a) and 15(b) are diagrams for explaining a problem of the conventional mobile communication system.

A mobile communication system according to a third embodiment of the present invention is described with reference to FIG. 11 through FIG. 13. Hereinafter, the mobile communication system according to the present embodiment will be described while focusing on the difference from the above-mentioned mobile communication system according to the first embodiment.

Figure 11:
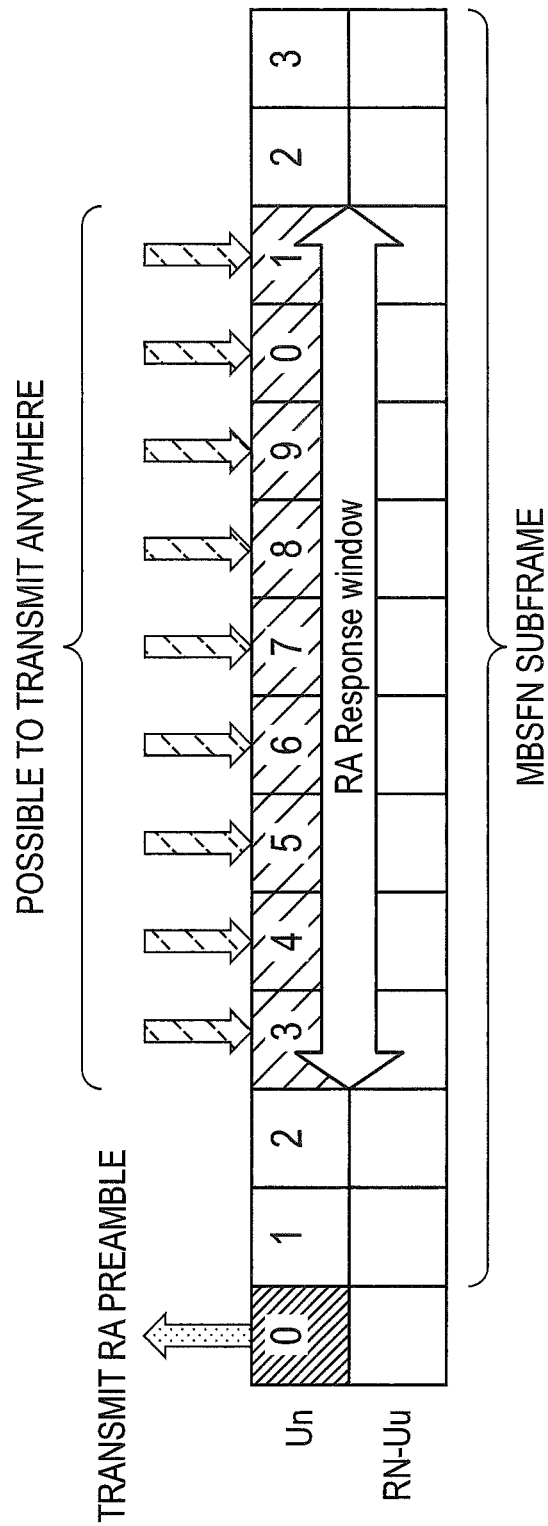
FIG. 11 is a diagram for explaining an example of a "RA Response window" determined by a radio base station according to a third embodiment of the present invention.

As illustrated in FIG. 11, when the RA procedure is started, the transmission unit 23 of the relay node RN is configured to release the setting of the MBSFN subframe and to stop transmitting a signal to the mobile station UE.

Hereinafter, with reference to FIG. 12 and FIG. 13, the operation of the mobile communication system according to the present embodiment will be described.

Furthermore, it is assumed that when the relay node RN operates as a "Half Duplex inband relay", the relay node RN transmits a signal to the mobile station UE in subframes other than MBSFN subframes, and does not transmit a signal to the mobile station UE in the MBSFN subframes.

When the RA procedure is started in step S3001A, a relay node RN in an RRC_Connected state in a cell subordinate to the radio base station DeNB releases the configuration of the Un subframe, releases the setting of the MBSFN subframe, stops the transmission of a signal to the mobile station UE in step S3001B, and then performs the RA procedure in step S3001C.

In step S3002, the relay node RN transmits "RA Preamble" to the radio base station DeNB.

In step S3003, the radio base station DeNB transmits "RA Response" to the relay node RN in an arbitrary subframe of the above-mentioned "RA Response window".

In step S3004, the relay node RN transmits "Schedule Transmission" to the radio base station eNB, and in step S3005, the radio base station eNB transmits "Contention Resolution" to the relay node RN.

In accordance with the mobile communication system according to the present embodiment, in the RA procedure, the relay node RN does not transmit a signal to the mobile station UE within the "RA Response window", so that it is possible for the radio base station DeNB to transmit the "RA Response" while avoiding interference.

The characteristics of the present embodiment as described above may be expressed as follows.

A first characteristic of the present embodiment is summarized in that a mobile communication method includes: a step of transmitting, by a radio base station DeNB, SIB (broadcast information) including a "RA Response window (a returnable period of a random access response for a mobile station)" for a mobile station UE and a "RA Response window (a returnable period of a random access response for a relay node)" for a relay node RN; a step of transmitting, by the radio base station DeNB, "RA Response (a random access response)" to the mobile station UE within the "RA Response window" for the mobile station UE when "RA Preamble (a random access preamble)" is received from the mobile station UE; a step of transmitting, by the relay node RN, a signal to the mobile station UE in a subframe other than an MBSFN subframe; and a step of transmitting, by the radio base station DeNB, "RA Response" to the relay node RN in the MBSFN subframe of the "RA Response window" for the relay node RN when "RA Preamble" is received from the relay node RN.

In the first characteristic of the present embodiment, the radio base station DeNB may render equal the "RA Response window" for the relay node RN, to a repetition period of the MBSFN subframe.

A second characteristic of the present embodiment is summarized in that a mobile communication method includes: a step of transmitting, by a relay node RN, a signal to a mobile station UE in a subframe other than an MBSFN subframe; a step of setting, by a radio base station DeNB, the MBSFN subframe to be included in a "RA Response window"; and a step of transmitting, by the radio base station DeNB, "RA Response" to the relay node RN in the MBSFN subframe of the "RA Response window" when "RA Preamble" is received from the relay node RN.

A third characteristic of the present embodiment is summarized in that a mobile communication method includes: a step of transmitting, by a relay node RN, a signal to a mobile station UE in a subframe other than an MBSFN subframe; a step of releasing, by the relay node RN, setting of the MBSFN subframe while stopping transmitting a signal to the mobile station UE when a RA procedure (a random access procedure) is started; and a step of transmitting, by the radio base station DeNB, "RA Response" to the relay node RN within a "RA Response window" when "RA Preamble" is received from the relay node RN.

A fourth characteristic of the present embodiment is summarized in that a radio base station DeNB includes: a broadcast information transmission unit 11 configured to transmit SIB including a "RA Response window" for a mobile station UE and a "RA Response window" for a relay node RN; and a RA procedure execution unit 12 (a random access procedure execution unit) configured to transmit, when "RA Preamble" is received from the mobile station UE, "RA Response" to the mobile station UE within the "RA Response window" for the mobile station UE, to transmit "RA Response" to the relay node RN in an MBSFN subframe of the "RA Response window" for the relay node RN when "RA Preamble" is received from the relay node RN, wherein in the MBSFN subframe, the transmission of a signal addressed to the mobile station UE is not performed by the relay node RN.

In the fourth characteristic of the present embodiment, the radio base station DeNB may include a setting unit 10 configured to render equal the "RA Response window" for the relay node RN, to a repetition period of the MBSFN subframe.

A fifth characteristic of the present embodiment is summarized in that a radio base station DeNB includes: a setting unit 10 configured to set an MBSFN subframe to be included in a "RA Response window"; and a RA procedure execution unit 12 configured to transmit "RA Response" to a relay node RN in the MBSFN subframe of the "RA Response window" when "RA Preamble" is received from the relay node RN, wherein in the MBSFN subframe, the transmission of a signal addressed to the mobile station UE is not performed by the relay node RN.

A fifth characteristic of the present embodiment is summarized in that a relay node RN includes: a transmission unit 23 configured to transmit a signal to a mobile station UE in a subframe other than an MBSFN subframe, wherein when a RA procedure is started, the transmission unit 23 is configured to release the setting of the MBSFN subframe and to stop transmitting a signal to the mobile station UE.

Note that the operation of the radio base station DeNB, the relay node RN, or the mobile station UE may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the radio base station DeNB, the relay node RN, or the mobile station UE. Furthermore, such a storage medium and processor may be arranged in the radio base station DeNB, the relay node RN, or the mobile station UE as discrete components.

Thus, the present invention has been explained in detail by using the above-mentioned embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST

UE . . . Mobile station
DeNB . . . Radio base station
RN . . . Relay node
10 . . . Setting unit
11 . . . Broadcast information transmission unit
12, 22 . . . RA procedure execution unit
21 . . . Reception unit
23 . . . Transmission unit

The invention claimed is:

1. A mobile communication method, comprising:
a step of transmitting, by a radio base station, broadcast information including a returnable period of a random access response for a mobile station and a returnable period of a random access response for a relay node;
a step of transmitting, by the radio base station, a random access response to the mobile station within the returnable period of the random access response for the mobile station when a random access preamble is received from the mobile station;
a step of transmitting, by a relay node, a signal to the mobile station in a subframe other than an MBSFN (Multimedia Broadcast and Multicast Service (MBMS) over a Single Frequency Network) subframe; and
a step of transmitting, by the radio base station, a random access response to the relay node in the MBSFN subframe of the returnable period of the random access response for the relay node when a random access preamble is received from the relay node.

2. The mobile communication method according to claim 1, wherein the radio base station renders equal the returnable period of the random access response for the relay node, to a repetition period of the MBSFN subframe.

3. A mobile communication method comprising:
a step of transmitting, by a relay node, a signal to a mobile station in a subframe other than an MBSFN (Multimedia Broadcast and Multicast Service (MBMS) over a Single Frequency Network) subframe;
a step of setting, by a radio base station, the MBSFN subframe to be included in a returnable period of a random access response; and
a step of transmitting, by the radio base station, a random access response to the relay node in the MBSFN subframe of the returnable period of the random access response when a random access preamble is received from the relay node.

4. A mobile communication method comprising:
a step of transmitting, by a relay node, a signal to a mobile station in a subframe other than an MBSFN (Multimedia Broadcast and Multicast Service (MBMS) over a Single Frequency Network) subframe;
a step of releasing, by the relay node, setting of the MBSFN subframe while stopping transmitting a signal to the mobile station when a random access procedure is started; and
a step of transmitting, by a radio base station, a random access response to the relay node within a returnable period of a random access response when a random access preamble is received from the relay node.

5. A radio base station, comprising:
a broadcast information transmission unit configured to transmit broadcast information including a returnable period of a random access response for a mobile station and a returnable period of a random access response for a relay node; and
a random access procedure execution unit configured to transmit a random access response to the mobile station within the returnable period of the random access response for the mobile station when a random access preamble is received from the mobile station, and to transmit a random access response to the relay node in an MBSFN (Multimedia Broadcast and Multicast Service (MBMS) over a Single Frequency Network) subframe of the returnable period of the random access response for the relay node when a random access preamble is received from the relay node, wherein
in the MBSFN subframe, transmission of a signal addressed to the mobile station is not performed by the relay node.

6. The radio base station according to claim 5, comprising: a setting unit configured to render equal the returnable period of the random access response for the relay node, to a repetition period of the MBSFN subframe.

7. A radio base station, comprising:
a setting unit configured to set an MBSFN (Multimedia Broadcast and Multicast Service (MBMS) over a Single Frequency Network) subframe to be included in a returnable period of a random access response; and
a RA procedure execution unit configured to transmit a random access response to a relay node in the MBSFN subframe of a returnable period of a random access response when a random access preamble is received from the relay node, wherein
in the MBSFN subframe, transmission of a signal addressed to the mobile station is not performed by the relay node.

8. A relay node comprising: a transmission unit configured to transmit a signal to a mobile station in a subframe other than an MBSFN (Multimedia Broadcast and Multicast Service (MBMS) over a Single Frequency Network) subframe, wherein
when a random access procedure is started, the transmission unit is configured to release setting of the MBSFN subframe and to stop transmitting a signal to the mobile station.

* * * * *